United States Patent [19]
Katzman

[11] 3,926,051
[45] Dec. 16, 1975

[54] FROST PROTECTION PLUG FOR A WATER METER

[76] Inventor: Oded Katzman, Samech Vav St., No. 32, Kiryat Chaiim, Israel

[22] Filed: Jan. 2, 1975

[21] Appl. No.: 537,959

[52] U.S. Cl. .................. 73/277; 137/60; 138/32; 220/281
[51] Int. Cl.² ........................................ G01F 15/10
[58] Field of Search .......... 73/277, 201; 137/59, 60; 138/27, 28, 32; 220/281

[56] References Cited
UNITED STATES PATENTS

| | | | |
|---|---|---|---|
| 724,718 | 4/1903 | Lambert | 73/277 |
| 3,220,600 | 11/1965 | Wojciechowski et al. | 220/281 |

FOREIGN PATENTS OR APPLICATIONS

| | | | |
|---|---|---|---|
| 628,733 | 7/1927 | France | 137/59 |

*Primary Examiner*—Richard C. Queisser
*Assistant Examiner*—John P. Beauchamp
*Attorney, Agent, or Firm*—M. A. Baskin

[57] ABSTRACT

The invention comprises a plug including a main body portion for screw-in insertion in an appropriate hole in the enlarged central portion of a water meter between the water inlet and outlet spuds thereof, said plug providing a piston member, exposed to the interior chamber of the water meter, connected to spring means and an outer cover, disposed in a recess in the outer side of the main body portion. When forces within the water meter build to a predetermined degree, the piston, spring and cover members are caused to pop out of the main body member, permitting the water in the enlarged central portion of the meter to drain therefrom.

6 Claims, 7 Drawing Figures

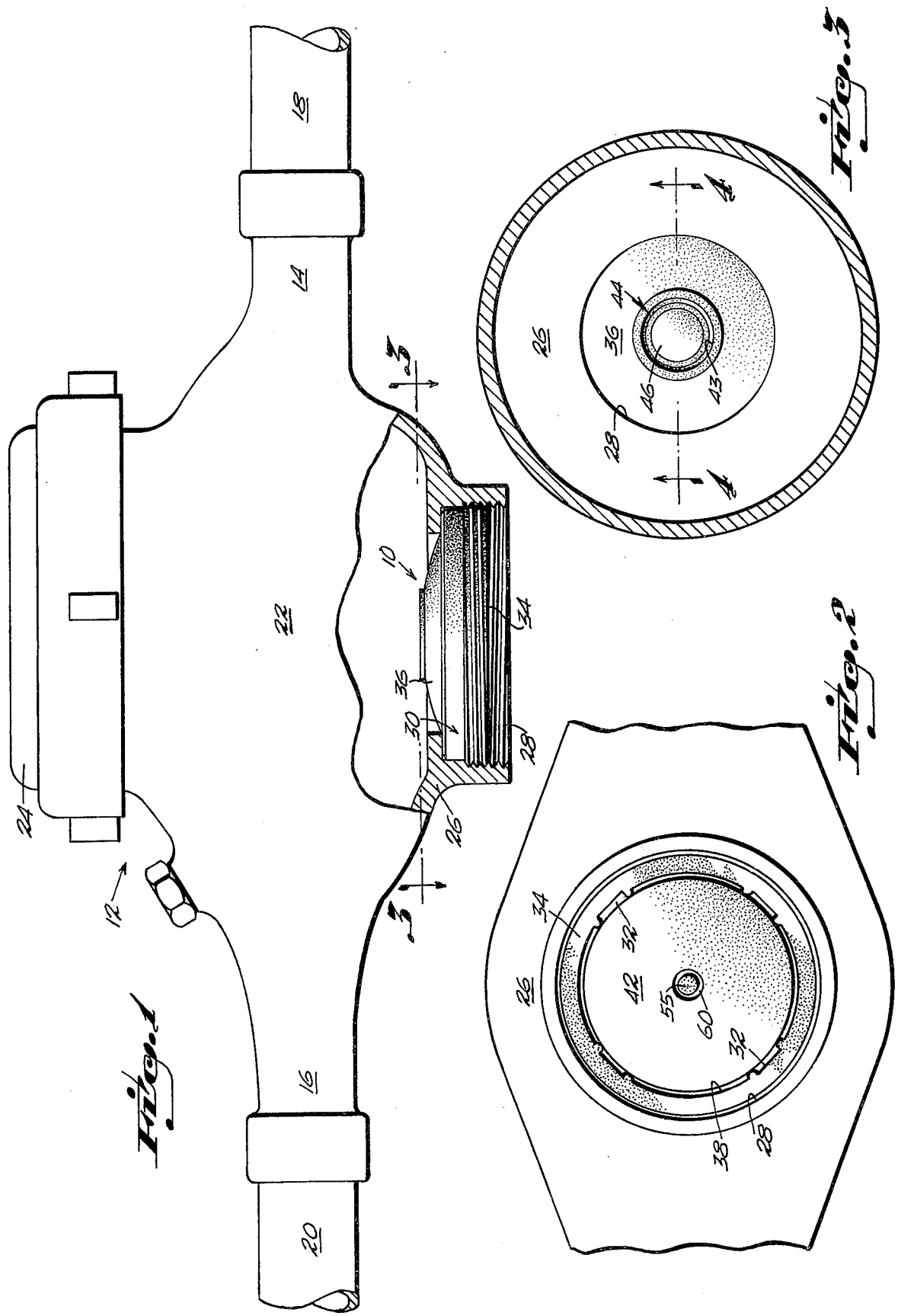

3,926,051

FROST PROTECTION PLUG FOR A WATER METER

BACKGROUND OF THE PRESENT INVENTION

Meters of the type used to measure and record the volume of water used in residences and business establishments are often positioned in locations where they are subjected to freezing and sub-freezing conditions. The mechanisms in meters of this type are quite complicated and expensive to produce and are often damaged or broken completely by the pressures imposed thereon by the formation of ice within the inlet and outlet spuds as well as in the main chambers which contain the mechanisms.

The present invention provides a pop-out safety plug including a piston member, exposed to the pressures within the main body portion of a water meter, which is designed to be ejected from the meter housing before the pressures therein build to a danger point such as occurs when ice forms in the spuds and eventually in the main chamber itself. Ice generally forms first in the inlet and outlet spuds due to the higher ratio of outside wall surfaces to the volume of water contained therein.

OBJECTS AND ADVANTAGES OF THE PRESENT INVENTION

One of the principal objects of the present invention is to provide a safety plug for a water meter which includes means to cause said plug to be ejected therefrom in the event that pressures within said meter, caused by the formation of ice therein, approach a degree which endangers the water measuring mechanisms in said meter.

Another object of this invention is to provide such a plug which includes piston means, exposed to the pressure within said meter, and spring means associated therewith to load the piston to a predetermined degree whereby said plug will be ejected from the meter when the pressures exceed said predetermined degree. The water within said meter and the associated pressures are relieved through the opening by the plug ejection.

Another object of this invention is to provide a frost protection plug for a water meter which is inexpensive to manufacture, is quickly and easily assembled and installed, and which is very accurate in performing its intended function.

BRIEF DESCRIPTION OF THE DRAWINGS

FIG. 1 is a side elevational view of a water meter, installed in a water line, with a portion thereof broken away to illustrate the frost protection plug of the present invention;

FIG. 2 is a bottom view of the plug portion of the meter;

FIG. 3 is a longitudinal sectional view, taken along the line 3 — 3 of FIG. 1;

DETAILED DESCRIPTION OF THE DRAWINGS

Figure 4:
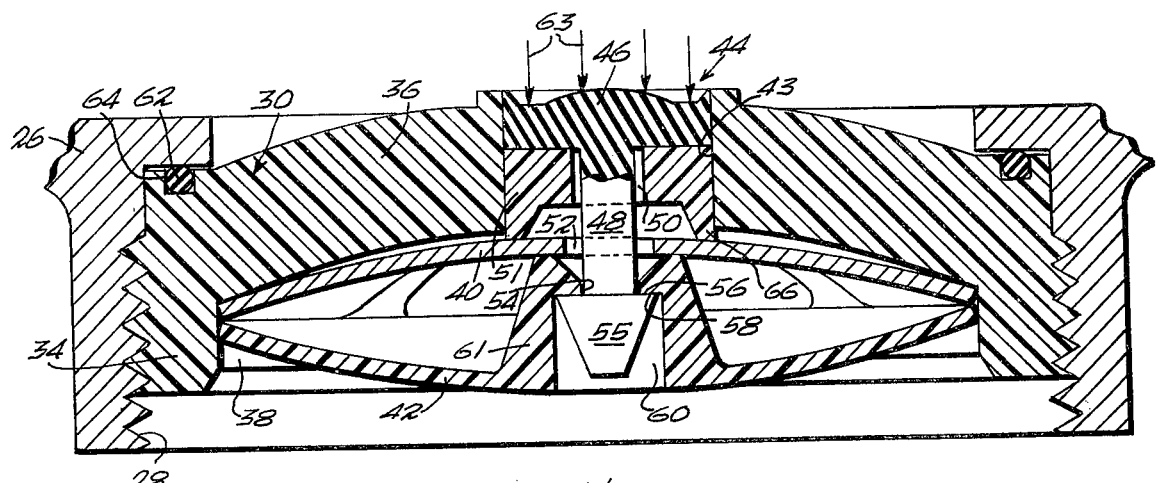
FIG. 4 is a cross sectional view taken through the plug assembly, along the line 4 — 4 of FIG. 3.

With reference to the drawings in which like reference numerals designate like or corresponding parts throughout the various views and with particular reference to FIG. 1, a typical water meter of the type using the frost protective plug assembly 10 of the present invention is designated generally at 12. The meter provides conventional inlet and outlet spuds 16 and 14, connected to respective inlet and outlet water pipes 20 and 18 and an enlarged central portion 22, carrying the conventional water measuring mechanism (not shown) with a top window lid 24 for manual observation of the volume recording dial means.

As best illustrated in FIG. 1, the plug 10 is preferably located in the bottom wall 26 of the enlarged central portion 22. A central screw threaded hole 28 is provided in the bottom wall 26 for screw threaded reception of a main plug housing 30, as best seen in FIGS. 4 and 5.

Notches 32 (FIG. 2) in the bottom portion of the annular skirt portion 34 of the housing 30 provide engagement means for a spanner wrench for inserting and removing the plug assembly 10 relative to the threaded hole 28. Annular skirt 34 and a top wall 36 define an annular cavity 38 in the bottom of the plug housing 30 for the reception of a spring member 40 and a convex retainer cover 42. A reduced diameter central annular hole 43 through the top wall 36, coaxial with said cavity 38, slidably receives a piston assembly 44 connected to the spring member 40 and retainer cover 42.

Figure 5:
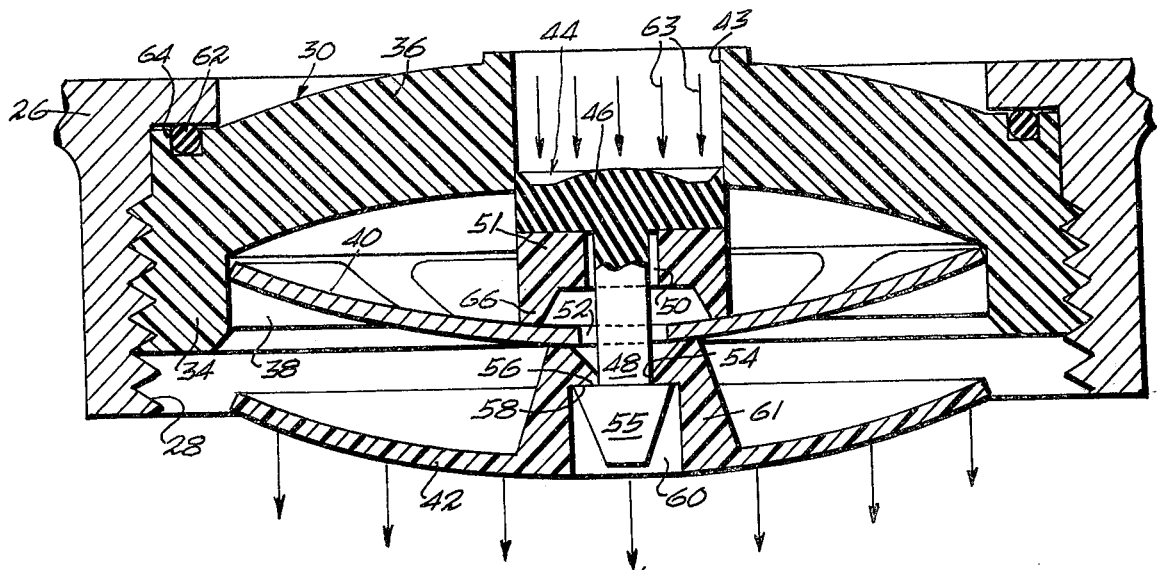
FIG. 5 is a cross sectional view similar to FIG. 4, illustrating the operation of the plug.

With particular reference to FIGS. 4 and 5, the piston assembly 44 comprises a top piston member 46, preferably formed of a relatively soft rubber or rubber-like material, in a sealing, slidable engagement with the annular wall of the hole 43. A stem portion 48 of the rubber piston member 46 extends axially downwardly through a central hole 50 in a load transferring disc 51, a central hole 52 in the spring member 40 and a central hole 54 in the retainer cover 42. An enlarged, inverted, truncated cone 55 engages over a complimentary shoulder 58 in a central recess 60 formed in an upwardly extending central boss 61 of the retainer cover 42. In this manner the piston member 46, load transferring disc 51, spring member 40 and a convex retainer cover 42 are held in assembly.

Figure 6:
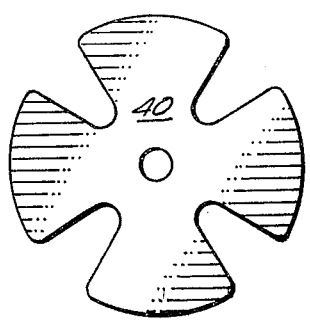
FIG. 6 is a plan view of a spring means, utilized in the plug of the present invention.

As seen in FIG. 6, the spring member 40 is formed of spring steel in a normally flat clover configuration. The peripheral diameter of the spring member 40 is slightly greater than the inside diameter of the annular cavity 38 so that it assumes a concave configuration when the piston assembly 44, spring 40 and cover 42 are assembled relative to the main plug housing 30 as seen in FIG. 4. In this assembled position, the soft rubber piston 46 and an O-ring 62 carried in an annular recess 64 in the top wall 36 of the plug housing 30 seals the inside chamber of the water meter.

Under freezing conditions, the water in the spuds 14 and 16 will freeze first due to a higher ratio of surface to water volume contained therein. Due to the expansion of the water that takes place while being transformed into ice, there is a gradual pressure rise in the enlarged central zone 22 of the water meter in which the water is still in a liquid state. This pressure rise is exerted on the top of the rubber piston 46 as indicated by the arrows 63 in FIG. 4. The pressure forces are transferred by the piston 46 to the load transfer disc 51 to the spring member 40. When the pressure reaches a predetermined level determined by the dimensions, the geometry and the physical properties of the various parts, the piston assembly 44 will be moved downwardly sufficiently to trigger a reverse bending of the spring member 40 to the inverted position of FIG. 5. Doing so, the combination of water pressure and spring action will cause the piston assembly 44, spring 40 and cover 42 to become entirely disengaged from the hole 43 and annular cavity 38 permitting the remaining water to drain from the meter, preventing any damage to the internal delicate parts of the measuring unit.

As seen in FIGS. 4 and 5, the preferred form of the invention, the load transferring disc 51 is preferably made from a suitable rigid plastic material, and includes a downwardly projecting peripheral flange 66 in contact with the top of the spring member 40, on a circular path away from the center. By placing the load away from the center, a higher force on the spring, to achieve reverse bending, is required without the need to make spring 40 thicker in section, thus maintaining its high flexibility. At the same time only a small movement of spring 40 is required in order to trigger a reverse bending. In this manner, the amount of pressure forces necessary to invert the bend in the spring member 40 may be more accurately determined.

Figure 7:
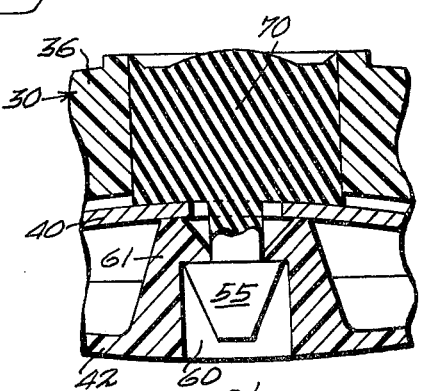
FIG. 7 is a fragmentary sectional view, similar to FIG. 4, illustrating a modified form of the present invention.

However, in its basic form, a single piece piston 70, formed from a soft rubber or rubber like material, may be provided to contact the central area of the spring member 40 as seen in FIG. 7. Although a water meter is the main use for this invention, it could also be used as pressure release device for any water valve or vessel containing liquids under pressure.

What is claimed is:

1. A frost protection plug assembly for a water meter, having inlet and outlet spuds connected respectively to inlet and outlet water conduits and an enlarged central portion providing a conventional water measuring unit and dial means to record the volume of water passing therethrough, said plug assembly comprising:
    A. A main plug housing fixed as by screw threading into a through hole in a wall of said central portion, said main plug housing providing:
        1. An annular outer cavity, and
        2. A reduced diameter annular hole, coaxial therewith, extending between said cavity and an interior chamber of said central portion;
    B. Spring means contained in said outer cavity in a normally tensioned condition;
    C. Piston means normally in a slidable, sealed condition within said reduced diameter annular hole;
    D. Connection means between said piston means and said spring means whereby said spring means and piston means are maintained in said normal positions when the water pressure in said water meter is maintained below a certain level and are ejected therefrom when said pressure level is exceeded to permit the water to drain from said water meter through said reduced diameter annular hole and outer cavity.

2. The device, as defined in claim 1, wherein said spring means is in the form of a flat, generally clover shaped spring steel member having an outer diameter slightly greater than the inner diameter of said outer annular cavity whereby said spring means assumes a concave configuration when forced into said annular cavity.

3. The device, as defined in claim 2, wherein said piston means is composed of a soft rubber-like material for sealing engagement with the inner wall of said reduced diameter annular hole.

4. The device, as defined in claim 2, wherein said connection means comprises an annular convex retainer cover disposed outwardly of said spring means and having a radius sized to permit free movement into and out of said annular cavity, and a stem portion extending outwardly from said piston means through central apertures in said spring means and in said annular convex retainer cover, an enlarged, inverted truncated conical head being provided on the outer end of said stem portion to retain said piston means, spring means and retainer cover in assembly.

5. The device, as defined in claim 4, including a load transferring disc, interposed on said stem portion between said piston means and the top surface of said spring means.

6. The device, as defined in claim 5, wherein said load transferring disc includes a peripheral flange in contact with said top surface.

* * * * *